Jan. 21, 1958  W. K. VOGEL ET AL  2,820,554
TAIL GATE LIFT FOR A VEHICLE
Filed Feb. 10, 1956  2 Sheets-Sheet 1
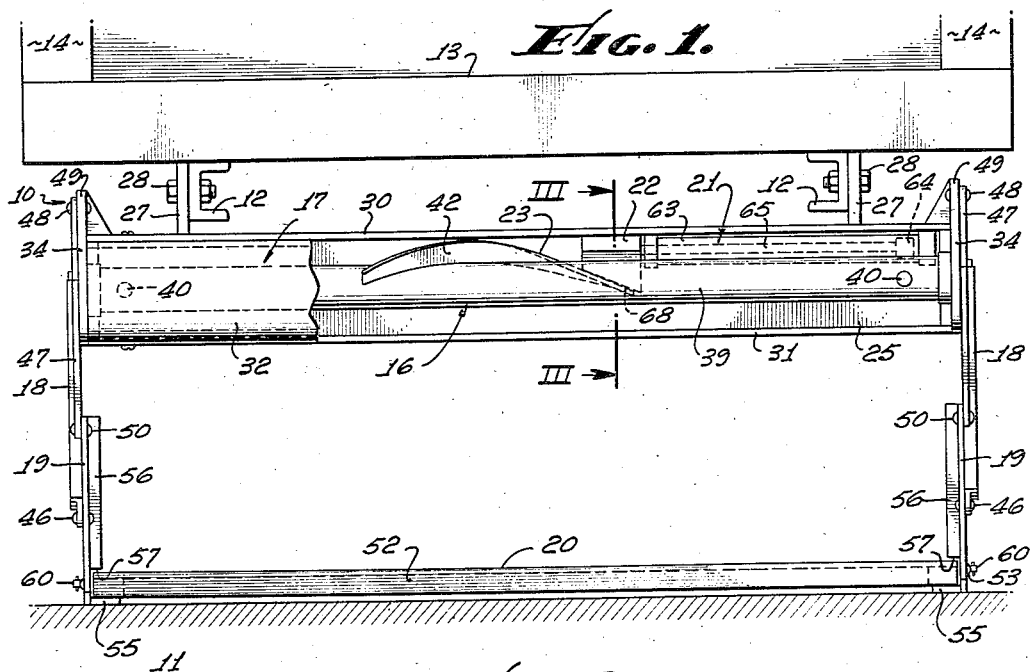
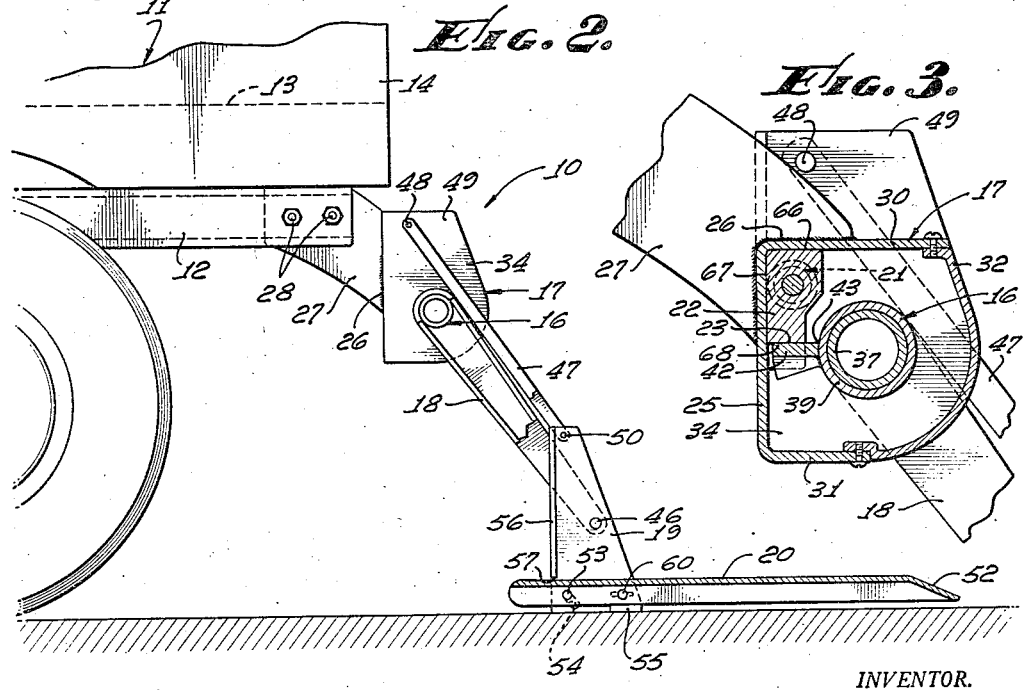
INVENTOR.
WILLIAM K. VOGEL
MILTON C. VOGEL
BY
ATTORNEY.

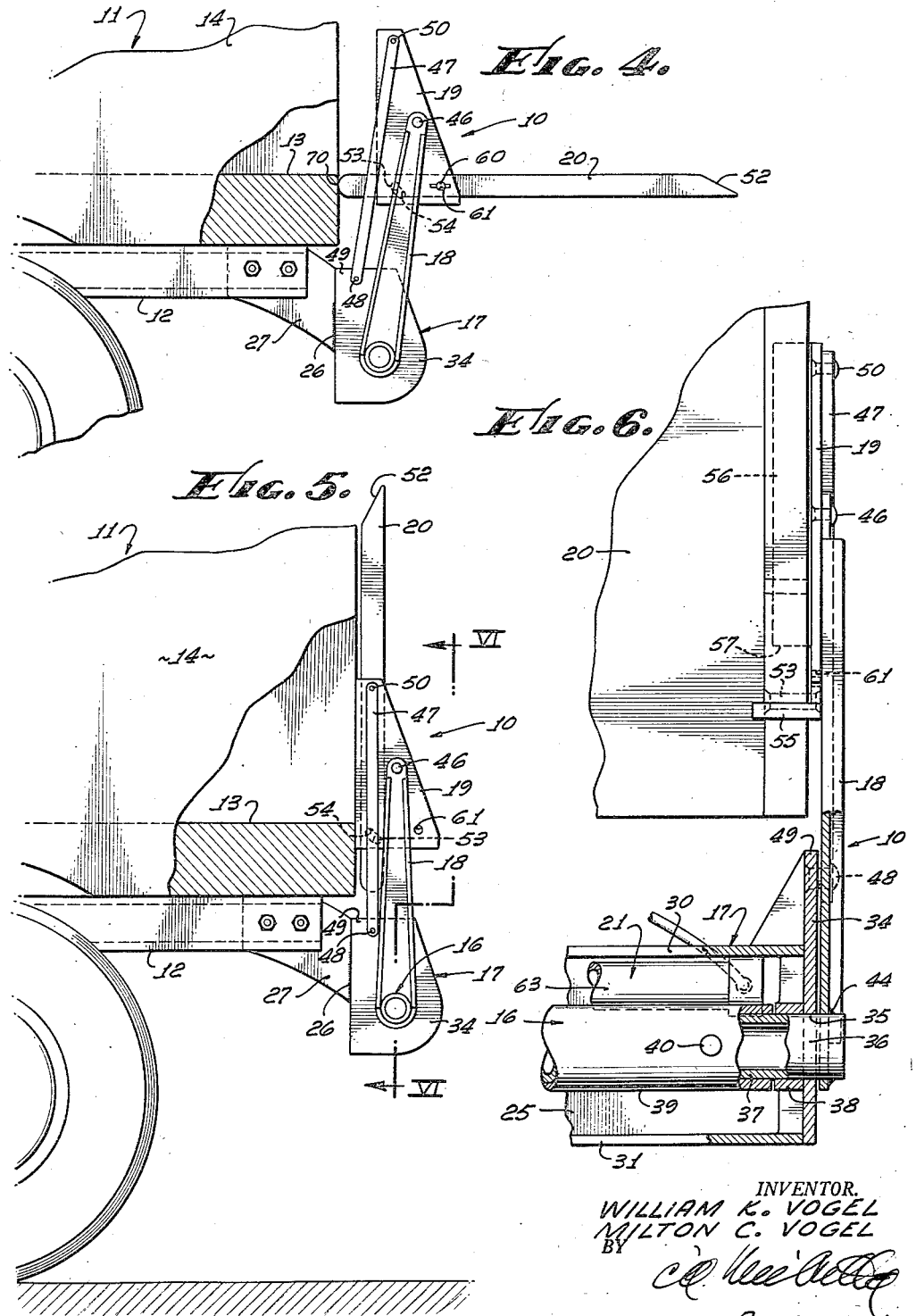

United States Patent Office 2,820,554
Patented Jan. 21, 1958

2,820,554

TAIL GATE LIFT FOR A VEHICLE

William K. Vogel and Milton C. Vogel, Los Angeles, Calif., assignors to The Ven Corporation, Los Angeles, Calif., a corporation of California Application February 10, 1956, Serial No. 564,651

10 Claims. (Cl. 214—77)

This invention relates to a power operable tail gate lift for vehicles and more particularly to a compact tail gate unit actuated by transversely movable means, the tail gate being horizontally disposed between two selected positions for loading and unloading and also being movable automatically into a vertical position to close the end of a vehicle body.

Some of the problems involved in providing a tail gate lift for vehicle bodies include that of attaching a tail gate lift unit to a vehicle body without modification of or interference with structural and operating parts of the vehicle. Modern vehicle bodies severely limit space available for installation of tail gate lifts. Such space limitations required special mounts for prior proposed lifts and also restricted the type of tail gate lift which could be utilized without making major changes in certain parts of the vehicle. In addition, mounting of a tail gate lift on a vehicle body usually requires removal of the rear bumper of the vehicle with the result that the end of the vehicle body and the tail gate mechanism are exposed and unprotected.

This invention contemplates a novel tail gate lift which is of simple compact unitary construction which does not require rearrangement of other vehicle parts, and which is provided with a wall which serves as a rear bumper for the vehicle, the wall at the same time protecting the tail gate mechanism. The invention contemplates a novel tail gate lift in which the tail gate is readily positionable for loading and unloading and provides a readily positioned end wall for the vehicle body when loading or unloading is accomplished.

The primary object of this invention therefore is to disclose and provide a novel vehicle tail gate lift of compact simple construction and operation.

An object of this invention is to disclose and provide a novel tail gate lift which may be readily and easily mounted adjacent the end of a vehicle body without rearranging or modification of adjacent vehicle structure and operating parts.

Another object of this invention is to disclose and provide a novel tail gate lift which may be rigidly mounted upon the vehicle chassis in the place provided for a rear bumper of the vehicle.

A further object of this invention is to disclose and provide such a tail lift as above described including means to pivotally mount the tail gate so that it may be turned about said pivotal mounting from horizontal to vertical position automatically and by the same means utilized to move the tail gate between ground and vehicle bed levels.

A still further object of this invention is to disclose and provide a compact tail gate lift including transversely movable means to turn a shaft to selectively position the tail gate, said transversely mounted means including fluid operable means having a slidable element movable in a path parallel to the axis of the shaft and engageable with a helical surface provided on the shaft.

Generally speaking, this invention contemplates a power actuated tail gate for a vehicle which includes a transversely mounted rotatable shaft provided with a helical surface. Means to mount the shaft on the vehicle body includes a housing adapted to be secured to the body by the usual bumper brackets, said housing having a rear wall which serves as a bumper. A tail gate is interconnected with the shaft and housing by lifting arms fixedly connected to the shaft and pivotally connected to the tail gate and by parallel link means pivotally interconnecting the tail gate and the housing for maintaining the tail gate in horizontal position between loading and unloading positions. Within the housing is provided a fluid operable means reciprocably actuating a shoe element parallel to the axis of the shaft, said shoe element having a face slidably engageable with a helical surface on the shaft whereby movement of the shoe element will cause selected rotation of the shaft and thereby produce lifting or lowering movement of the tail gate. The tail gate is provided with a transverse edge face cooperable with the vehicle body and with the lifting arms to cause the tail gate to be vertically positioned to act as an end wall for the vehicle body.

These and many other objects and advantages will be readily apparent to those skilled in this art from the following description of the drawings in which an exemplary embodiment is shown.

In the drawings:

Fig. 1 is an end view of a tail gate lift embodying this invention mounted on the rear of a vehicle body, the tail gate being shown at ground level position;

Fig. 2 is a side view of Fig. 1 partly in section and showing a fragment only of the vehicle.

Fig. 3 is a sectional view taken in vertical plane indicated by line III—III of Fig. 1;

Fig. 4 is a side view partly in section of the tail gate lift shown in Figs. 1 and 2, in upper horizontal position at the level of the vehicle bed;

Fig. 5 is a fragmentary side view partly in section showing the tail gate of Fig. 4 in vertical position; and Fig. 6 is a rear view partly in section taken in the planes indicated by the lines VI—VI of Fig. 5.

In the exemplary tail gate lift generally indicated at 10 in the drawings, only the rear portion of a vehicle 11 is shown. Vehicle 11 may be of any well known manufacture and includes chassis frame members 12 and a truck bed 13 having side walls 14 extending upwardly therefrom. The vehicle 11 is only generally illustrated and does not include in detail vehicle structural parts and vehicle operating mechanisms normally mounted on the vehicle.

The tail gate lift 10 generally comprises a transvsrsely disposed horizontal shaft means 16 rotatably mounted within a transverse housing 17. The shaft means 16 carries at each end a lifting arm 18 pivotally connected to upstanding tail gate side members 19 pivotally and movably connected to a tail gate 20. Means to rotate shaft means 16 to lift and position the tail gate includes a transversely disposed fluid operable cylinder means 21 provided with a sliding shoe element 22 engageable with a helical surface 23 on the shaft means 16.

It will be noted that the housing 17 may include a generally U-section member extending transversely across the end of vehicle body 11, said housing 17 including a transverse front wall 25 to which may be welded as at 26 angle brackets 27 which may be secured as by bolts 28 to vehicle chassis members 12. The brackets 27 may be similar to brackets used to secure a rear bumper to the vehicle body and it will be noted that the housing 17 is mounted in generally the same location as that occupied by a rear bumper of a vehicle.

The housing 17 includes top and bottom parallel walls 30 and 31 and a rear wall 32 which serves to close the U-section member of housing 17 and to provide a rearmost transversely extending wall which may serve as a rear bumper and to protect and enclose the shaft means 16 and cylinder means 21.

The housing 17 may also be provided with end walls 34, said end walls including transversely aligned openings 35 to receive end portions 36 of an inner tubular member 37 forming part of shaft means 16. Extending inwardly from each opening 35 and secured to end wall 34 may be provided a bearing collar 38 to afford selected bearing surface for rotation of end portions 36 of shaft means 16.

Ensleeved over tubular member 37 may be an outer tubular member 39, said member 39 extending between inner edge faces of opposed collars 38. Tubular members 37 and 39 may be interconnected to prevent relative rotation in any suitable manner as by a diametrically disposed pin 40 provided at each end of shaft means 16.

Helical surface 23 may be provided on shaft means 16 in any suitable manner. In this example, helical surface 23 is provided on a longitudinally extending wing-like element 42 formed of bar stock of rectangular section twisted, curved, and secured to tubular member 39 as by welding at 43 thereto. The method of twisting and at the same time turning said wing-like element 42 may be readily accomplished by first bending edgewise a selected length of rectangular bar stock to an amount equal to approximately the diameter of the tubular member 39. One end of the bar stock so bent may be held in a slot corresponding to the bar stock section and provided in a tailstock which also supports a hollow cylindrical tubular member to be formed as member 39. The other end of the tubular member and the bar stock may be held by a headstock plate provided with a circular opening for the tubular member and a slot for the bar stock. The headstock plate is arranged to be rotated in well known manner and as said headstock plate is rotated through a selected number of degrees, the rectangular bar stock is turned and twisted about the cylindrical surface of the tubular member to provide a helically arranged wing-like element extending outwardly from the cylindrical surface of the tubular member 39. As soon as the bar stock is turned a selected number of degrees and the helical surface is disposed at a preselected helix angle, the edge of the bar stock adjacent to the tubular member 39 may be immediately welded thereto.

While a specific method for forming the helical surface on the shaft 16 has been described above, it will be understood by those skilled in this art that other means providing a helical surface of selected length and helix angle may be provided such as a helical thread cut into the surface of tubular member 39 and the like.

The helical wing-like element 42 in this example is secured to shaft 16 over a central portion of its length and has a large helix angle so that rotation of the shaft means 16 will move lift arms 18 through approximately 140°, or from the arm position shown in Fig. 2 to that of Fig. 5.

End portions 36 of shaft means 16 are fixedly connected to lifting arms 18 as by welding at 44. The lifting arms 18 may be formed of any suitable metal section to provide strength and rigidity. At their other ends lifting arms 18 may be pivotally connected as at 46 to upstanding tail gate side members 19, said pivotal connection 46 being spaced above tail gate 20 and approximately located centrally of members 19.

A pair of link members 47 are provided in parallelogram linkage arrangement with lifting arms 18 in order to maintain tail gate 20 in horizontal position during movement from ground level position to vehicle bed position. Link members 47 may be pivotally connected at their top ends as at 48 to upwardly extending projections 49 of end walls 34. At their other ends, link members 47 are pivotally connected as at 50 to the top portions of upstanding members 19.

The tail gate 20 extends between upstanding members 19 and may be formed of any suitable metal plate or other material to provide a flat rigid rectangular platform for loading and supporting cargo or articles thereon. For convenience the rearmost edge of tail gate 20 may be provided with a bevel edge face 52 to facilitate loading.

Tail gate 20 may be mounted on upstanding side members 19 for supporting articles when the gate is in horizontal position and for moving relative to the side members from horizontal position to vertical position to serve as an end closure for the vehicle body. Tail gate 20 may be positioned in a horizontal plane by means of a pair of trunnion pins 53, each extending outwardly from opposite sides of the tail gate adjacent the inner portion thereof. Each pin 53 extends into a downwardly and rearwardly curved slot 54 provided on each side member 19 adjacent the lower portion thereof. Forwardly of each slot 54 each side member 19 is provided with an inturned support lug 55 upon which the tail gate may rest. When the tail gate is carried by support lugs 55 in horizontal position, the inner side portions of said gate extend beneath a stop edge face 57 provided on an inturned vertical flange 56 on each side member 19. Thus in horizontal position tail gate 20 is carried by support lugs 55 and held against pivoting on said lugs when load is applied to the tail gate by the contact of the tail gate with the stop faces 57 on the side members 19. In addition, the trunnion pins 53 may abut the top end wall of slot 54.

In vertical positioning of tail gate 20, the tail gate is pivoted and moved relative to the upstanding side members 19 by means of the pin and slot connections 53—54 as later described. Vertical position of the tail gate is defined by abutment of side margins of the tail gate against outwardly directed faces of the inturned vertical flanges 56 on the upstanding side members 19. In vertical position trunnion pins 53 are positioned against the bottom end walls of slots 54.

Locking means may also be provided between the upstanding side members 19 and tail gate 20 to maintain said tail gate and said members in selected relationship for loading and unloading and at the same time to restrain relative movement between said members which might interfere with loading and unloading. Such locking means may include a locking pin 60 carried by each upstanding side member 19, manually insertable through a corresponding hole 61 in the side member 19, and projecting through an edge wall of the tail gate into interlocking relation therewith at a point spaced rearwardly from the trunnion pins 53. It will thus be readily apparent that before the tail gate 20 may be pivoted into vertical position, pins 60 must be removed so as to permit rotation of tail gate 20 about trunnion pins 53. It is understood by those skilled in this art that other locking means may be employed to hold side members 19 and tail gate 20 in selected relationship during loading and unloading.

Within the housing 17 may be provided fluid operable means 21 which may include a cylinder 63 transversely disposed adjacent to top wall 30 and front wall 25 and one end of the housing. The cylinder 63 may be provided with inlet and outlet ports to permit introduction of pressure fluid, such as compressed air or liquid, into the cylinder for exerting pressure against one side of piston head 64. Piston head 64 is carried at one end of a piston rod 65 which projects through the opposite end of the cylinder 63 and carries on its outer end sliable shoe element 22. It will be noted that the shoe element 22 includes top and side faces 66 and 67 which slidably engage opposed internal surfaces on walls 30 and 25 for preventing rotation of shoe element 22. Shoe element 22 also includes an inclined bottom surface 68 which may correspond to the helical angle of the helical surface 23, said surface 68 slidably engaging the helical surface 23.

It will be noted from a consideration of Fig. 1 that when the piston head 64 is retracted into cylinder 63, the shoe element 22 is positioned in slidable engagement with one end of surface 23. When piston head 64 is moved by introduction of fluid under pressure to the cylinder, the slidable shoe element 22 is moved along helical surface 23 for a length virtually the length of piston rod 65, such length and the helix angle of the helical surface 23 being sufficient to cause the lifting arms 18 to be raised from ground position (Fig. 2) to substantially vertical position (Fig. 5) as by rotation of shaft 16.

A tail gate 20 may be positioned at ground level (Fig. 2) when piston head 64 is positioned at one end of cylinder 63. In this tail gate position articles may be conveniently placed upon tail gate 20. Introduction of fluid under pressure to cylinder 23 will urge piston head 64 inwardly and cause the sliding shoe element 22 to move in a path parallel to the axis of shaft means 16 and to slidably engage helical surface 23. As the shoe element 22 moves toward the other end of surface 23, the shaft means 16 is caused to turn and in so turning causes the lifting arms 18 to move upwardly about the axis of shaft means 16. As the tail gate 20, lifting arms 18, and link members 47 are raised, the tail gate 20 maintains horizontal position during such movement because of the parallel linkage arrangement of link members 47 and lifting arms 18. When the tail gate 20 reaches the plane of the top surface of the bed 13 of the vehicle body, introduction of pressure fluid into the cylinder 63 is stopped and the tail gate is held in this position. The rear transverse edge face of tail gate 20 is in abutment as at 70 with an opposing end face on the bed of the vehicle body. Further upward movement of the tail gate 20 may be prohibited by locking pin 60 since at this position the tail gate will tend to begin to rotate about the abutting engagement at 70 of the rear edge face with the vehicle body. In bed level position articles carried by tail gate 20 may be readily unloaded onto the truck body or articles may be loaded from the truck body onto the tail gate 20.

After loading or unloading is completed it is desirable that the open end of the vehicle body be closed by tail gate 20. To accomplish automatic closing by tail gate 20, locking pin 60 may be conveniently withdrawn from its overlying position relative to tail gate. Introduction of additional pressure fluid into cylinder 63 causes shoe element 22 to slidably move further along helical surface 23 to produce further rotation of lifting arms 18 in an upward direction. Upon such further rotation, the rear edge face of the tail gate 20 serves as an initial fulcrum contacting the vehicle bed to cause trunnion pins 53 to move in slots 54 until they abut against opposite end walls of said slots 54. Once movement of trunnion pins 53 has been accomplished, tail gate 20 is then free to rotate about pins 53 into a vertical position as shown in Fig. 5. In such vertical position the top side marginal surfaces of tail gate 20 are in abutment against the inturned flanges 56 on upstanding side members 19. The upstanding side members 19 are in abutting engagement against the rear edge face of the vehicle body and lifting arms 18 are in substantially vertical position. It will thus be readily apparent to those skilled in the art that the tail gate 20 is readily movable into position as an end closure for the vehicle body.

It will be readily understood by those skilled in the art that the tail gate lift 10 described above may be readily mounted on the rear of a vehicle body without modification of or interference with vehicle parts and mechanisms. Tail gate lift 10 is actuated in novel manner by a transversely movable element and while said element has been exemplarily described as being actuated by a fluid operated cylinder means, it will be understood that other suitable means for transversely moving the slidable element 22 may be employed. It will be noted that the tail gate 20 is also mounted in novel manner for relative movement with the upstanding side members 19 so as to positively position the tail gate in horizontal planes when loading and unloading and in movement between these two positions. At the same time, tail gate 20 is so mounted as to permit its movement readily into vertical position to serve as a closure for the end of the vehicle body. The rear transverse edge of the tail gate may be curvilinear in section to facilitate fulcruming of the tail gate when it is moved into end closure position. Those skilled in the art will readily recognize the facility with which the tail gate lift 10 is frame-mounted on the vehicle chassis for strength.

All changes and modifications coming within the scope of the appended claims are embraced thereby.

We claim:

1. In a power actuated tail gate for a vehicle body comprising in combination: a shaft provided with a helical surface for a portion of its length; means to mount the shaft transversely adjacent the end of the body and including a housing adapted to be secured to the body, said housing having a wall providing a rear bumper for the vehicle body; a tail gate provided with upstanding side members; lifting arms pivotally connected to said upstanding side members and fixedly connected to the shaft; link means pivotally interconnecting said housing and said upstanding side members on the tail gate; and means extending in the direction of the axis of the shaft within the housing operable to turn the shaft to selectively position the tail gate, said operable means including fluid operable means having an element slidable on said helical surface on the shaft and movable in a path parallel to the axis of the shaft.

2. In a power actuated tail gate for a vehicle body comprising in combination: a shaft provided with a helical surface for a portion of its length; means to mount the shaft transversely adjacent the end of the body and including a transverse housing adapted to be secured across the end of the body; a tail gate provided with upstanding side members pivotally connected thereto in spaced relation to the edge of the tail gate proximate to the vehicle body; lifting arms pivotally connected to said upstanding side members and fixedly connected to the shaft; link means pivotally interconnecting said housing and said upstanding side members on the tail gate; and means extending in the direction of the axis of the shaft within the housing operable to turn the shaft to selectively position the tail gate, said operable means including fluid operable means having an element slidable on said helical surface on the shaft.

3. In a power actuated tail gate for a vehicle body comprising in combination: a shaft provided with a helical surface for a portion of its length; means to mount the shaft transversely adjacent the end of the body and including a housing adapted to be secured to the body; a tail gate provided with upstanding side members; lifting arms pivotally connected to said upstanding side members and fixedly connected to the shaft; link means pivotally interconnecting said housing and said upstanding side members on the tail gate; and means extending in the direction of the axis of the shaft within the housing operable to turn the shaft to selectively position the tail gate, said operable means including fluid operable means having an element slidable on said helical surface on the shaft, each upstanding side member being provided with a slot, pins on said tail gate slidable in said slots for pivotally interconnecting said side members and said tail gate and for movement of said tail gate from horizontal to vertical position.

4. A tail gate lift for a vehicle body, comprising in combination: a shaft; means to mount the shaft transversely adjacent the end of said vehicle body; a tail gate;

lifting arms fixedly connected to the shaft; means on said tail gate pivotally connected to said lifting arms and including means cooperable with said tail gate for rotation of the tail gate to a vertical position in adjacent relation to the end of the vehicle body; and transversely movable means cooperably engaging means on said shaft to turn the shaft to selectively position the tail gate.

5. A tail gate lift as stated in claim 4 wherein said means for rotation of said tail gate includes a pivotal and slidable connection for said tail gate.

6. A tail gate lift as stated in claim 4 including a transverse edge face on said tail gate proximate thereto and adapted to abut the end of said vehicle body to cause movement of said tail gate toward vertical position.

7. A tail gate lift for a vehicle body comprising, in combination: a hollow housing adapted to be transversely supported from the end of said body and including a transversely extending wall serving as a bumper; a transverse shaft rotatable within the housing; a tail gate; upstanding members pivotally and slidably connected to sides of the tail gate; means including lifting arms pivotally connected to said upstanding members and fixedly connected to the shaft; and means for rotating the shaft to raise and lower the lifting arms to position said tail gate in vertically spaced horizontal positions and in a vertical position at the end of the vehicle body.

8. A tail gate lift for vehicles comprising, in combination: a tail gate serving as a platform and having a transverse edge proximate to the vehicle; upstanding side members; a pivotal connection between each side member and the tail gate spaced from said transverse edge, each pivotal connection including pin and slot means; and means connected to said side members for raising and lowering the tail gate to spaced horizontal positions, said raising and lowering means being actuatable to abut said transverse edge against an adjacent portion of the vehicle to fulcrum said tail gate about said abutment to vertically position the tail gate at the end of the vehicle.

9. In combination with a tail gate lift: an upstanding side member including a slot adapted to cooperate with means on a tail gate; a flange on said side member adjacent said slot adapted to horizontally support a tail gate; and a second flange on said side member disposed at right angles to said first flange adapted to position a tail gate in vertical position, said first and second flanges being spaced apart to allow a portion of said tail gate to be positioned therebetween.

10. In a power actuated tail gate for a vehicle body comprising in combination: a shaft provided with a helical surface; means to mount the shaft transversely adjacent the end of the body; a tail gate; upstanding side members pivotally connected to the gate and having stop means limiting pivotal movement of the gate to horizontal and vertical positions; means including lifting arms pivotally connected to said side members and fixedly connected to the shaft for maintaining the tail gate horizontal between two selected vertically spaced positions; transversely movable means operable to turn the shaft to position the tail gate in said two vertically spaced positions, said operable means including an element slidable along said helical surface; and means on said upstanding side members to cooperate with said pivotal connections between said side members and said tail gate to retain said tail gate in horizontal position in said two selected positions.

References Cited in the file of this patent
UNITED STATES PATENTS

| | | |
|---|---|---|
| 965,009 | Philbrick | July 19, 1910 |
| 1,545,302 | Bring | July 7, 1925 |
| 2,298,166 | Richards | Oct. 6, 1942 |
| 2,391,813 | Wood | Dec. 25, 1945 |
| 2,527,818 | Ives | Oct. 31, 1950 |
| 2,725,152 | Gwinn | Nov. 29, 1955 |
| 2,743,618 | Watson et al. | May 1, 1956 |
| 2,792,135 | Wood | May 14, 1957 |